US011860600B2

(12) United States Patent
Kitano et al.

(10) Patent No.: US 11,860,600 B2
(45) Date of Patent: Jan. 2, 2024

(54) PROGRAMMABLE DISPLAY DEVICE WITH USER INPUT CONFIGURATION ADJUSTMENT

(71) Applicant: SCHNEIDER ELECTRIC JAPAN HOLDINGS LTD., Tokyo (JP)

(72) Inventors: Yoshimasa Kitano, Osaka (JP); Tsutomu Itabashi, Osaka (JP)

(73) Assignee: SCHNEIDER ELECTRIC JAPAN HOLDINGS, LTD., Tokyo (JP)

(*) Notice: Subject to any disclaimer, the term of this patent is extended or adjusted under 35 U.S.C. 154(b) by 38 days.

(21) Appl. No.: 17/346,914

(22) Filed: Jun. 14, 2021

(65) Prior Publication Data
US 2022/0163940 A1 May 26, 2022

(30) Foreign Application Priority Data

Nov. 24, 2020 (JP) ................. 2020-194507

(51) Int. Cl.
G05B 19/05 (2006.01)
G06F 3/048 (2013.01)
G05B 23/02 (2006.01)

(52) U.S. Cl.
CPC ......... *G05B 19/056* (2013.01); *G05B 19/058* (2013.01); *G05B 23/0272* (2013.01); *G05B 2219/14006* (2013.01); *G05B 2219/14055* (2013.01); *G06F 3/048* (2013.01)

(58) Field of Classification Search
CPC ................ G05B 19/056; G05B 19/058; G05B 23/0272; G05B 2219/14006; G05B 2219/14055; G06F 3/048; G06F 9/451; G06F 9/44505
See application file for complete search history.

(56) References Cited

U.S. PATENT DOCUMENTS

| 7,389,204 B2* | 6/2008 | Eryurek | G05B 23/0272 340/506 |
| 9,164,647 B2* | 10/2015 | Ueno | G06F 3/0481 |
| 2010/0050097 A1* | 2/2010 | McGreevy | G05B 19/409 707/E17.014 |

(Continued)

FOREIGN PATENT DOCUMENTS

JP 2011-028496 2/2011

OTHER PUBLICATIONS

EZAutomation, "EZTouch® EZ3 Series® Hardware Manual", 2017, EZAutomation website, URL :<https://store.ezautomation.net/v/vspfiles/pdf/ez3series_manual.pdf> (Year: 2017).*

(Continued)

*Primary Examiner* — Kenneth M Lo
*Assistant Examiner* — Jonathan Michael Skrzycki
(74) *Attorney, Agent, or Firm* — Nixon & Vanderhye, PC

(57) ABSTRACT

A programmable display device includes: an obtaining section for obtaining data; a setting accepting section for accepting, via a setting screen displayed in response to predetermined operation, a process setting for a content of a process to be executed for the data and information for executing the process; and a process executing section for executing the process in accordance with the process setting, the setting accepting section accepting the process setting in a state where the obtaining section is executing the obtaining of the data.

4 Claims, 7 Drawing Sheets

(56) References Cited

U.S. PATENT DOCUMENTS

| | | | |
|---|---|---|---|
| 2014/0108985 A1* | 4/2014 | Scott | G05B 19/4188 |
| | | | 715/771 |
| 2015/0193418 A1* | 7/2015 | Koska | G05B 19/0423 |
| | | | 715/223 |
| 2018/0364897 A1 | 12/2018 | Takashima | |
| 2021/0103265 A1* | 4/2021 | Fujimura | G06F 3/0484 |

OTHER PUBLICATIONS

European Patent Office Search Report for Application No. 21177495.5 dated Nov. 29, 2021, 8 pages.

\* cited by examiner

PROGRAMMABLE DISPLAY DEVICE WITH USER INPUT CONFIGURATION ADJUSTMENT

This Nonprovisional application claims priority under 35 U.S.C. § 119 on Patent Application No. 2020-194507 filed in Japan on Nov. 24, 2020, the entire contents of which are hereby incorporated by reference.

TECHNICAL FIELD

The present invention relates to a programmable display device.

BACKGROUND ART

Patent Literature 1 discloses a technique according to which a programmable display device sequentially displays, by display objects on a screen, statuses and circumstances of an input device and an output device on the basis of device data. This technique carries out logging of the device data according to logging setting information generated by a logging setting information generating device. In addition, according to the above technique, when a collection cycle setting is selected on a menu screen, a collection period setting section transmits a predetermined instruction to a display control section so as to cause a display section to display a setting screen via which collection cycle information can be input.

CITATION LIST

Patent Literature

[Patent Literature 1]
Japanese Patent Application Publication Tokukai No. 2011-28496

SUMMARY OF INVENTION

Technical Problem

However, the technique disclosed in Patent Literature 1 does not assume a situation in which an end user of the programmable display device attached to a device configures and/or changes a setting of logging or the like in the programmable display device. If there arises a need to configure and/or change the setting of logging or the like in the programmable display device, the end user needs to request an outside manufacturer or the like that has designed the device to configure and/change the setting. Thus, the technique disclosed in Patent Literature 1 takes much cost and time to configure and/or change the setting, disadvantageously. An aspect of the present invention has an object to reduce the cost and time taken to configure a process setting for a programmable display device.

Solution to Problem

In order to attain the object, a programmable display device in accordance with an aspect of the present invention includes: an obtaining section configured to obtain data; a setting accepting section configured to accept a process setting via a setting screen displayed in response to predetermined operation, the process setting concerning (a) a content of a process to be executed for the data obtained by the obtaining section and (b) information for executing the process; and a process executing section configured to execute the process including the content, on the basis of the information and in accordance with the process setting accepted by the setting accepting section, the setting accepting section being further configured to accept the process setting in a state where the obtaining section is executing the obtaining of the data.

Advantageous Effects of Invention

According to an aspect of the present invention, it is possible to reduce the cost and time taken to configure the process setting of the programmable display device.

DESCRIPTION OF EMBODIMENTS

Embodiment 1

Figure 1:
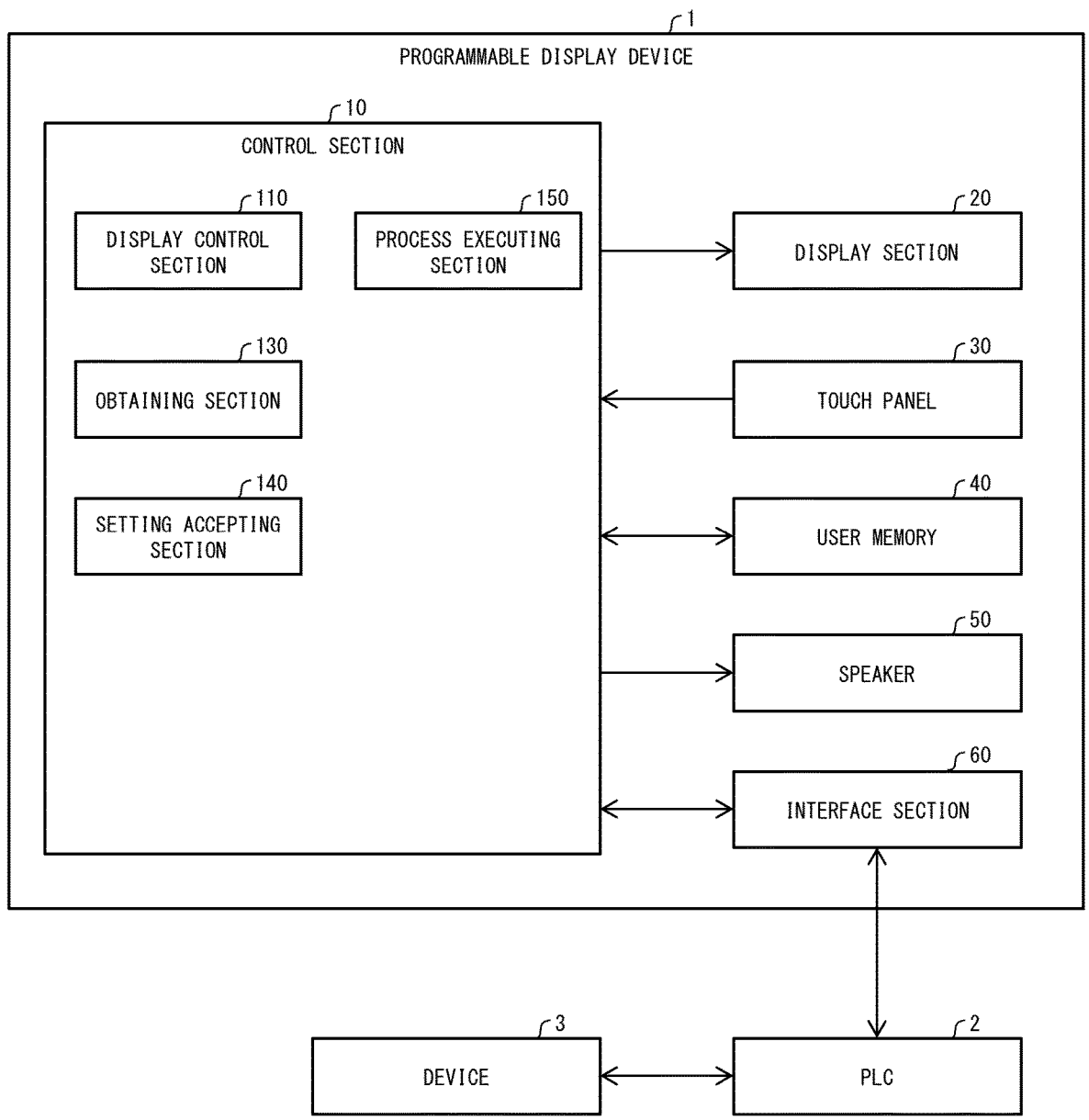
FIG. 1 is a block diagram illustrating a configuration of a programmable display device in accordance with Embodiment 1 of the present invention.

<Configuration of Programmable Display Device 1>
FIG. 1 is a block diagram illustrating a configuration of a programmable display device 1 in accordance with Embodiment 1 of the present invention. As shown in FIG. 1, the programmable display device 1 includes a control section 10, a display section 20, a touch panel 30, a user memory 40, a speaker 50, and an interface section 60.

The programmable display device 1 is connected to a programmable logic controller (PLC) 2 via a communication cable, so as to be communicable with the PLC 2. The programmable display device 1 is a dedicated computer configured to display a graphics screen for operation and display to realize an operation function and a display function specific to the programmable display device. The programmable display device 1 is used as a human machine interface (HMI).

The control section 10 identifies an action of displaying the status of a device 3 connected to the PLC 2 or an action of controlling the status of the device 3 in accordance with the operation carried out on the touch panel 30. The control section 10 controls each section of the programmable display device 1. The control section 10 includes a display control section 110, an obtaining section 130, a setting accepting section 140, and a process executing section 150.

The display control section 110 causes the display section 20 to display a screen. The obtaining section 130 obtains, from the PLC 2, data related to the device 3. The setting accepting section 140 accepts a process setting concerning the data obtained by the obtaining section 130. The process executing section 150 executes a process in accordance with the process setting accepted by the setting accepting section 140.

Here, the process setting refers to configuring a setting concerning (a) the content of a process to be executed for the data obtained by the obtaining section 130 and (b) information for executing the process. To be more specific, the process setting includes configuring a new setting and reconfiguring the setting to change (edit) the already-set matter(s).

The display section 20 displays a screen. The touch panel 30 accepts input operation that an end user has carried out on the display section 20. The user memory 40 stores information therein. The speaker 50 outputs audio to the outside of the programmable display device 1. Hereinafter, the end user may simply be referred to as a "user", occasionally.

Note that the programmable display device 1 may incorporate an interface alone in place of the speaker 50. If the programmable display device 1 incorporates the interface alone, the speaker 50 is connected to the programmable display device 1 as an external device via the interface. The interface section 60 is a communication section via which the programmable display device 1 communicates with the PLC 2.

The PLC 2 is a control device configured to read the status of the device 3 and/or provide a control instruction to the device 3 at predetermined scanning times in accordance with the sequential program prepared by a user. The device 3 may be a device controlled by the PLC 2, a device configured to output a value detected by a sensor, and/or the like. There are a plurality of such devices 3. The programmable display device 1 displays, via e.g. a screen and/or parts, the status of the device 3 obtained by the PLC 2.

<Indication of Display Screen P1 by Programmable Display Device 1>

Figure 2:
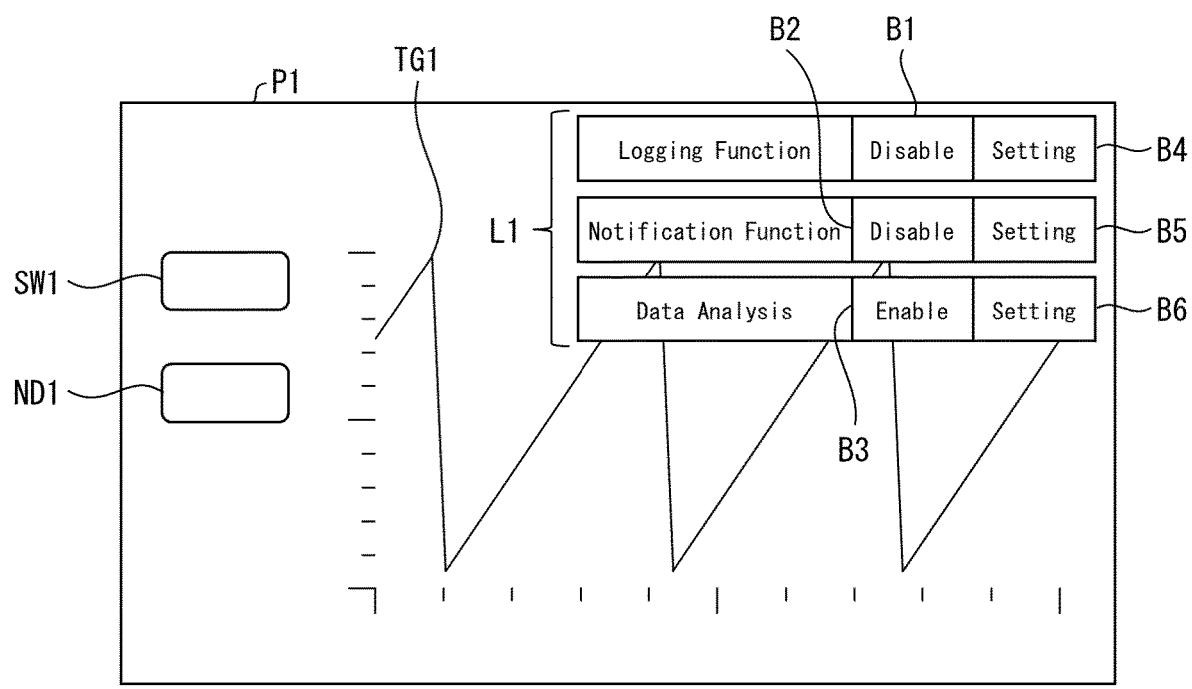
FIG. 2 is a view illustrating a display screen displayed on a display section included in the programmable display device shown in FIG. 1.

FIG. 2 is a view illustrating a display screen P1 displayed on the display section 20, which is included in the programmable display device 1 shown in FIG. 1. The display screen P1 is shown as one example of the display screen displayed on the display section 20. The process related to the display screen P1 described herein is also described as one example. The display control section 110 causes the display section 20 to display the display screen P1 shown in FIG. 2.

The display screen P1 includes a switch SW1, a numerical value indicator ND1, and a trend graph TG1. The switch SW1 is an object corresponding to one of the devices 3, and accepts operation for turning-ON/OFF, for example. The numerical value indicator ND1 is an object corresponding to one of the devices 3, and displays the numerical value of the latest data obtained by the obtaining section 130. The trend graph TG1 is an object corresponding to one of the devices 3, and indicates a graph of the values of the data obtained by the obtaining section 130 and accumulated in the user memory 40.

The display control section 110 causes the display section 20 to display the switch SW1, the numerical value indicator ND1, and the trend graph TG1 as objects in this manner. Each object has a device address and/or a variable(s) specifying a place for storing data that the obtaining section 130 is to obtain from a device memory of the PLC 2.

The user memory 40 stores therein data of plural display screens including the display screen P1. The user memory 40 accumulates therein data that the obtaining section 130 has obtained from the PLC 2 for the purpose of displaying the trend graph TG1.

When the user carries out predetermined operation such as pressing and holding the numerical value indicator ND1 on the display screen P1, the display control section 110 causes the display section 20 to display a setting item list L1 concerning the numerical value indicator ND1. The setting item list L1 includes switching buttons B1, B2, and B3 and setting buttons B4, B5, and B6.

The switching button B1 is a button used to switch between enabling and disabling of a logging function that is to be executed by the process executing section 150. The switching button B2 is a button used to switch between enabling and disabling of a notification function that is to be executed by the process executing section 150. The switching button B3 is a button used to switch between enabling and disabling of data analysis that is to be executed by the process executing section 150. The logging, notification, and data analysis that are to be executed by the process executing section 150 are examples of the content of the process to be executed for the data obtained by the obtaining section 130.

The setting button B4 is a button used to cause the display section 20 to display a setting screen for configuring a setting concerning the logging function that is to be executed by the process executing section 150. The setting button B5 is a button used to cause the display section 20 to display a setting screen for configuring a setting concerning the notification function that is to be executed by the process executing section 150. The setting button B6 is a button used to cause the display section 20 to display a setting screen for configuring a setting concerning the data analysis that is to be executed by the process executing section 150.

<Indication of Setting Screen SP1 by Programmable Display Device 1>

Figure 3:
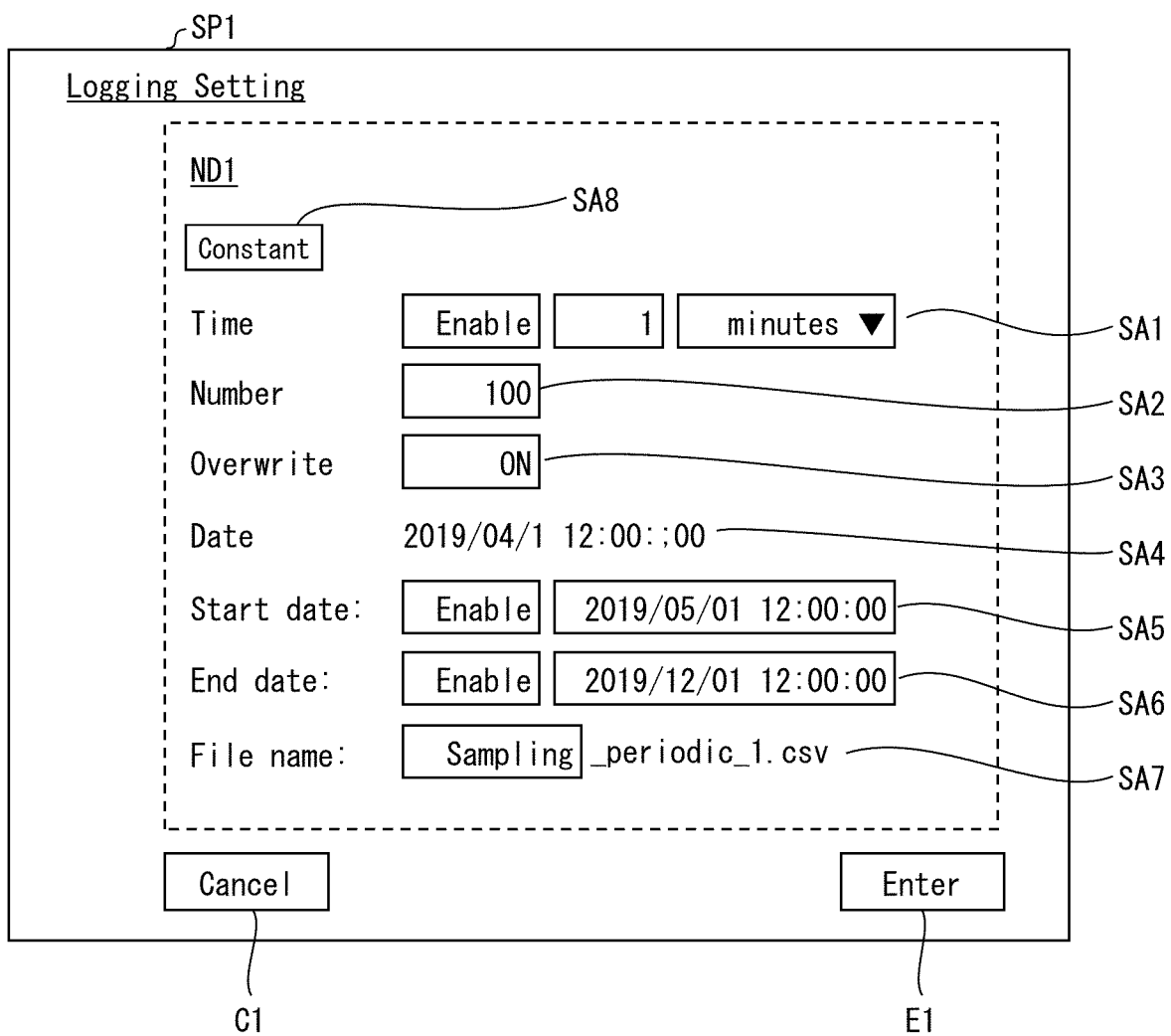
FIG. 3 is a view illustrating a setting screen displayed on the display section included in the programmable display device shown in FIG. 1.

FIG. 3 is a view illustrating a setting screen SP1 displayed on the display section 20, which is included in the programmable display device 1 shown in FIG. 1. The setting screen SP1 is one example of the setting screen displayed on the display section 20. The process concerning the setting screen SP1 described herein is also one example. In response to user operation of touching the setting button B4 on the display screen P1, the display control section 110 causes the display section 20 to display the setting screen SP1 for configuring a setting concerning the logging function that is to be executed by the process executing section 150.

The setting screen SP1 is a screen for accepting a setting concerning the logging of data related to the numerical value indicator ND1. Hereinafter, data indicating a numerical value concerning the numerical value indicator ND1 will be referred to as numerical data. The setting screen SP1 includes setting items SA1 to SA8, a cancel button C1, and an enter button E1.

The setting item SA1 is an item for setting a cycle of executing logging of numerical data to the user memory 40. The setting item SA1 is provided based on the assumption that the process executing section 150 executes logging of numerical data to the user memory 40 in response to a trigger issued at a certain cycle, in a state where the user memory 40 can store the numerical data therein. The setting item SA2 is an item for setting the number of logs of numerical data that the process executing section 150 logs to the user memory 40.

The setting item SA3 is an item for enabling or disabling the function in which the process executing section 150 overwrites the logs of the numerical data in the user memory 40 so as to keep updating the logs of the numerical data logged to the user memory 40. In a case where the function that can be set via setting item SA3 is disabled, the process executing section 150 stops logging of the numerical data to the user memory 40 at the point of time when the number of logs of the numerical data logged to the user memory 40 reaches the number of logs having been set via the setting item SA2.

The setting item SA4 is an item for setting the current time and for displaying the current time so that it can be referred to at the time of setting a starting date and time and an ending date and time. The setting item SA5 is an item for setting the date and time to start the logging of the numerical data that is to be carried out by the process executing section 150 with respect to the user memory 40. The setting item SA6 is an item for setting the date and time to end the logging of the numerical data that is to be carried out by the process executing section 150 with respect to the user memory 40.

The setting item SA7 is an item for setting a file name of a file which is created by the process executing section 150 and in which the numerical data is accumulated. The process executing section 150 stores this file in the user memory 40.

The setting item SA8 is an item for accepting a selection as to which of a first setting and a second setting is to be selected. In the first setting, only numerical data obtained by the obtaining section 130 while the numerical value indicator ND1 is displayed on the display section 20 is specified as target data, which is numerical data that is to be subjected to the logging executed by the process executing section 150. In the second setting, numerical data obtained by the obtaining section 130 while the obtaining section 130 is executing the obtaining of the numerical data is specified as the target data.

When the user carries out operation of touching the enter button E1 on the setting screen SP1, the setting accepting section 140 detects the operation from the touch panel 30. The setting accepting section 140 accepts, via the setting screen SP1, a process setting configured via the setting items SA1 to SA8, which are included in the setting screen SP1. The process executing section 150 causes the process setting accepted by the setting accepting section 140 to be stored in the user memory 40 such that the process setting is associated with the numerical value indicator ND1. The display control section 110 causes the display section 20 to stop displaying the setting screen SP1, and causes the display section 20 to display the display screen P1.

Meanwhile, when the user carries out operation of touching the cancel button C1 on the setting screen SP1, the display control section 110 causes the display section 20 to stop displaying the setting screen SP1, and causes the display section 20 to display the display screen P1.

As described above, the setting accepting section 140 accepts, via the setting screen SP1 displayed in response to predetermined operation, a process setting concerning (a) the content of a process to be executed for the numerical data obtained by the obtaining section 130 and (b) information for executing the process. The setting accepting section 140 accepts the process setting in a state where the obtaining section 130 is executing the obtaining of the numerical data. The process executing section 150 executes the process including the content on the basis of the above information and in accordance with the process setting accepted by the setting accepting section 140.

The process setting configured via the setting screen SP1 is accepted in a state where the obtaining section 130 is executing the obtaining of the numerical data. Consequently, the end user can easily configure the process setting via the setting screen SP1 by himself/herself, without the need to pay attention to a variable name and/or a device address. This can reduce the cost and time taken for the process setting.

Furthermore, the above configuration enables the end user to configure the process setting by himself/herself, thereby eliminating the need to request an outside manufacturer or the like to configure the process setting. In addition, the above configuration eliminates the need for the outside manufacturer or the like to identify, among plural pieces of data, a piece(s) of data requiring a process setting before delivering the programmable display device 1 to the end user. Consequently, the outside manufacturer or the like can deliver the programmable display device 1 to the end user in a simple manner without various kinds of advance preparations.

The configuration shown in FIG. 3 will be further described. Specifically, the setting accepting section 140 accepts, via the setting screen SP1, accumulation of the numerical data obtained by the obtaining section 130, the accumulation of the numerical data being accepted as the content of the process to be executed for the numerical data obtained by the obtaining section 130. The process executing section 150 executes, as the process to be executed for the numerical data, the accumulation of the numerical data accepted by the setting accepting section 140. Consequently, the end user can easily configure the process setting concerning the accumulation of the numerical data via the setting screen SP1.

In addition, the setting accepting section 140 accepts, via the setting screen SP1, the selection as to which of the first setting and the second setting is to be selected, the selection being accepted as the process setting accepted by the setting accepting section 140. In a case where the first setting is accepted by the setting accepting section 140, the process executing section 150 executes logging of only the numerical data obtained by the obtaining section 130 while the numerical value indicator ND1 is displayed on the display section 20. In a case where the second setting is accepted by the setting accepting section 140, the process executing section 150 executes logging of the numerical data obtained by the obtaining section 130 while the obtaining section 130 is executing the obtaining of the numerical data.

In the case where the first setting is accepted by the setting accepting section 140, the amount of the numerical data that is to be subjected to the logging by the process executing section 150 is smaller than that of the case where the second setting is accepted, and thus the burden on the programmable display device 1 can be reduced. In addition, since the above configuration enables the end user to switch between the first setting and the second setting, the amount of data to be collected can be changed according to the period of time to execute the logging.

<Indication of Setting Screen SP2 by Programmable Display Device 1>

Figure 4:
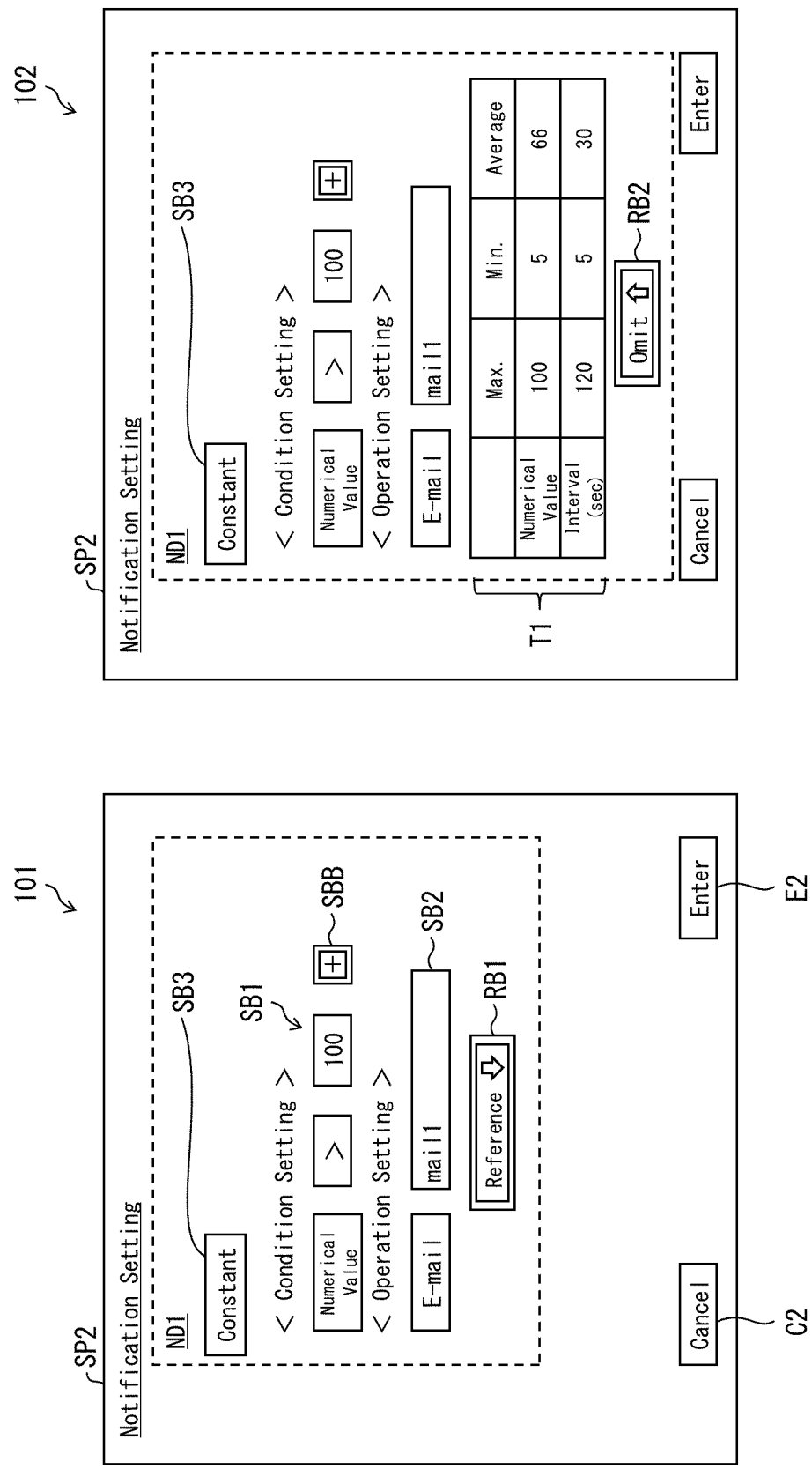
FIG. 4 is a view illustrating a setting screen that is not the setting screen shown in FIG. 3.

FIG. 4 is a view illustrating a setting screen SP2 that is not the setting screen SP1 shown in FIG. 3. In response to user operation of touching the setting button B5 on the display screen P1 shown in FIG. 2, the display control section 110 causes the display section 20 to display a setting screen SP2 used to configure a setting concerning the notification function that is to be executed by the process executing section 150, as indicated by the reference sign 101 in FIG. 4. The setting screen SP2 accepts a notification setting concerning the numerical value indicator ND1. The setting screen SP2 includes setting items SB1 to SB3, a reference button RB1, a cancel button C2, and an enter button E2.

The setting item SB1 is an item for setting a predetermined condition. The process executing section 150 executes notification concerning the numerical value indicator ND1, if the predetermined condition on the numerical data concerning the numerical value indicator ND1 is satisfied. The notification may be an indication of an abnormality of the numerical value indicator ND1, for example. Via the setting item SB1, it is possible to set the predetermined condition. The predetermined condition is used as a condition for monitoring the numerical value indicator ND1.

The setting item SB1 includes a plus button SBB, which is a button used to set a new condition in addition to the condition(s) having been set via the setting item SB1. The user can add a new condition by carrying out operation of touching the plus button SBB. Via the setting item SB1, it is possible to set AND, OR, and the like.

The setting item SB2 is an item for setting a way to execute the notification concerning the numerical value indicator ND1. The way that can be set via the setting item SB2 may be an e-mail, audio output from the speaker 50, a buzzer, and/or color changing or flashing of the display screen P1, for example. The setting item SB3 is concerned with a setting content similar to that of the setting item SA8. However, the setting item SB3 is related to notification, rather than to the logging of the setting item SA8.

The reference button RB1 is a button used to cause the display section 20 to display a result of data analysis executed by the process executing section 150. Upon user operation of touching the reference button RB1, the display control section 110 causes the display section 20 to display a table T1, which indicates the result of the data analysis executed by the process executing section 150, as indicated by the reference sign 102 in FIG. 4. The table T1 is one example of the result of the process having been executed by the process executing section 150.

The table T1 includes, as examples of representative values of the numerical data calculated by the process executing section 150, a maximum value, a minimum value, and an average value of the numerical values of the logs of the numerical data as well as a maximum value, a minimum value, and an average value of the intervals between the logs of the numerical data. That is, the table T1 includes the information indicating the changes in the numerical values of the numerical data occurred until the process setting is configured via the setting screen SP2 as well as the information indicating the time intervals between the changes in the numerical values.

The reference sign 102 in FIG. 4 indicates the table T1 showing the result of the data analysis. However, this is not limitative. Alternatively, the table T1 may indicate a result obtained by any of other calculation methods and other analysis methods involving use of the numerical data accumulated in the user memory 40. Upon user operation of touching an omission button RB2, the display control section 110 causes the display section 20 to stop displaying the result of the data analysis.

When the user carries out operation of touching the enter button E2 on the setting screen SP2, the setting accepting section 140 accepts, via the setting screen SP2, the process setting configured via the setting items SB1 to SB3, which are included in the setting screen SP2. The process executing section 150 causes the user memory 40 to store therein the process setting accepted by the setting accepting section 140. The display control section 110 causes the display section 20 to stop displaying the setting screen SP2, and then causes the display section 20 to display the display screen P1.

Meanwhile, when the user carries out operation of touching the cancel button C2 on the setting screen SP2, the display control section 110 causes the display section 20 to stop displaying the setting screen SP2, and then causes the display section 20 to display the display screen P1.

As described above, the setting accepting section 140 accepts, as the content of the process to be executed for the numerical data obtained by the obtaining section 130, notification that is to be executed when a predetermined condition on the numerical data is satisfied. The setting accepting section 140 accepts the predetermined condition as the information for executing the process.

In addition, the process executing section 150 executes the notification as the process to be executed for the numerical data obtained by the obtaining section 130, if the predetermined condition on the numerical data is satisfied. Consequently, the end user can easily configure the setting concerning the predetermined condition for the notification via the setting screen SP2.

Furthermore, the process executing section 150 executes, as the process to be executed for the numerical data, the data analysis of analyzing the numerical data obtained by the obtaining section 130. The display control section 110 causes the display section 20 to display the setting screen SP2 in response to predetermined operation, and also causes the display section 20 to display the result of the process having been executed by the process executing section 150. In other words, the display control section 110 causes the display section 20 to display the result of the data analysis having been executed by the process executing section 150.

Consequently, the setting screen SP2 is displayed on the display section 20, and the result of the data analysis is also displayed on the display section 20. Therefore, the end user can easily configure the process setting via the setting screen SP2 while referring to the result of the data analysis.

<Indication of Setting Screen SP3 by Programmable Display Device 1>

Figure 5:
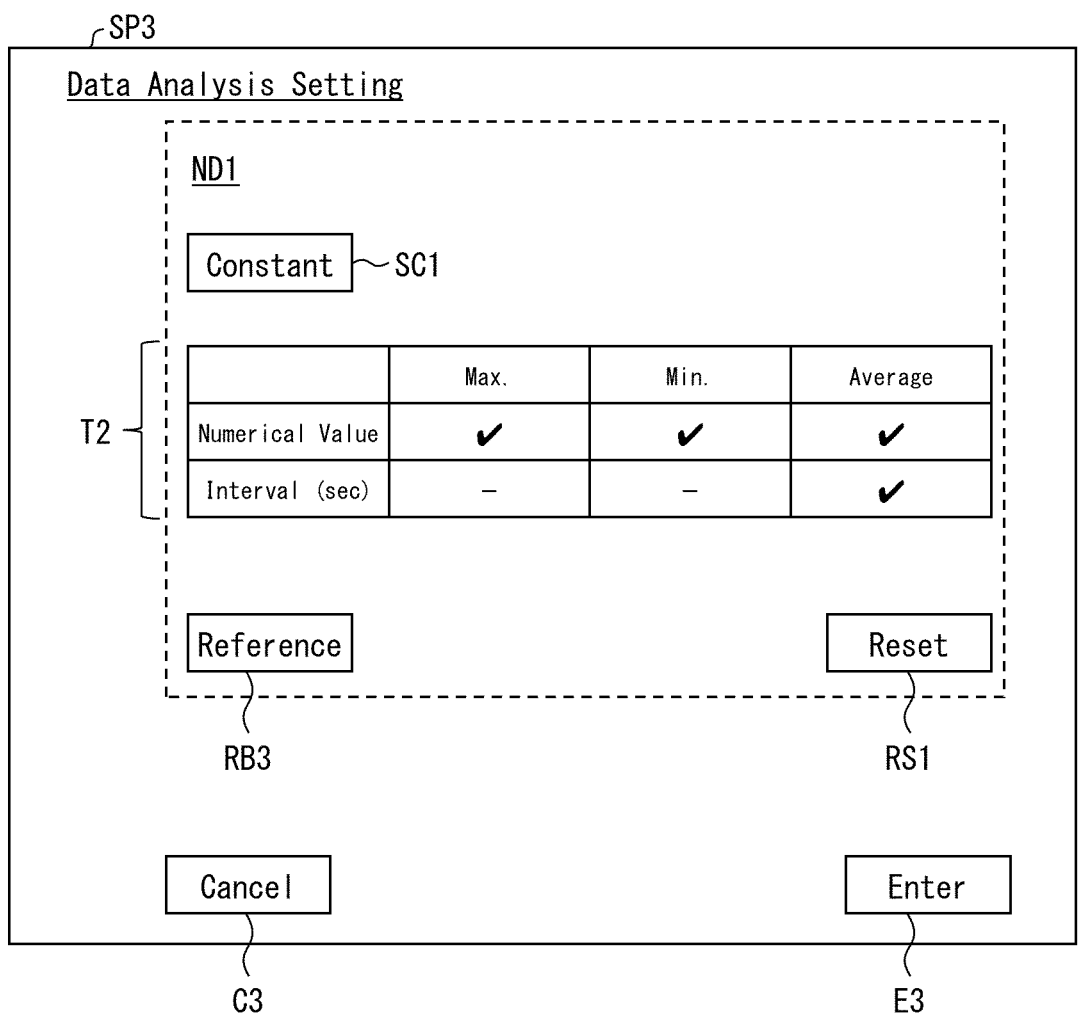
FIG. 5 is a view illustrating a setting screen that is not the setting screen shown in FIG. 3 or the setting screen shown in FIG. 4.

FIG. 5 is a view illustrating a setting screen SP3 that is not the setting screen SP1 shown in FIG. 3 or the setting screen SP2 shown in FIG. 4. In response to user operation of touching the setting button B6 on the display screen P1 shown in FIG. 2, the display control section 110 causes the display section 20 to display a setting screen SP3 used to configure a setting concerning the data analysis that is to be executed by the process executing section 150, as shown in FIG. 5.

The setting screen SP3 is a screen for accepting a setting concerning data analysis of numerical data related to the numerical value indicator ND1. The setting screen SP3 includes a setting item SC1, a table T2, a reference button RB3, a reset button RS1, a cancel button C3, and an enter button E3. The setting item SC1 is concerned with a setting content similar to that of the setting item SA8. However, the setting item SC1 is related to data analysis, rather than to the logging of the setting item SA8.

Via the table T2, a kind of a representative value that is to be set as the target data can be selected from among the kinds of the representative values of the numerical data included in the table T1. Upon user operation of touching one(s) of the kinds of the representative values included in the table T2, the display control section 110 causes the display section 20 to display a sign(s) indicating the selected one(s) of the kinds of the representative values. The process executing section 150 calculates only a representative value(s) of the kind(s) having been selected via the table T2, and the display control section 110 causes the display section 20 to display only the representative value(s) having been calculated by the process executing section 150.

Similarly to the reference button RB1, the reference button RB3 is a button used to cause the display section 20 to display a result of data analysis having been executed by the process executing section 150. Upon user operation of touching the reference button RB3, the display control section 110 causes the display section 20 to display the table T1, which is described above.

The reset button RS1 is a button used to reset the representative value(s) of the numerical data having been calculated by the process executing section 150 to zero. When the user carries out operation of touching the reset button RS1, the process executing section 150 detects the operation from the touch panel 30, and resets the calculated representative value(s) of the numerical data to zero.

When the user carries out operation of touching the enter button E3 on the setting screen SP3, the setting accepting section 140 accepts, via the setting screen SP3, the process setting configured via the setting item SC1, the table T2, and the reset button RS1 included in the setting screen SP3. The process executing section 150 causes the process setting accepted by the setting accepting section 140 to be stored in the user memory 40 such that the process setting is associated with the numerical value indicator ND1. The display control section 110 causes the display section 20 to stop displaying the setting screen SP3, and then causes the display section 20 to display the display screen P1.

Meanwhile, when the user carries out operation of touching the cancel button C3 on the setting screen SP3, the display control section 110 causes the display section 20 to stop displaying the setting screen SP3, and then causes the display section 20 to display the display screen P1.

As described above, the setting accepting section 140 accepts, via the setting screen SP3, data analysis of analyzing the numerical data obtained by the obtaining section 130, the data analysis being accepted as the content of the process to be executed for the numerical data obtained by the obtaining section 130. The process executing section 150 executes, as the process to be executed for the numerical data, the data analysis accepted by the setting accepting section 140.

Furthermore, the setting accepting section 140 accepts the data analysis as the content of the process to be executed for the numerical data obtained by the obtaining section 130. Specifically, the setting accepting section 140 accepts, via the setting screen SP3, at least one kind of the representative values of the numerical data as the information for executing the process.

The process executing section 150 calculates only the representative value of the kind accepted by the setting accepting section 140, and the display control section 110 causes the display section 20 to display only the representative value having been calculated by the process executing section 150. Consequently, the end user can cause the display section 20 to display only the necessary representative value by setting the kind of the representative value via the setting screen SP3.

Embodiment 2

Figure 6:
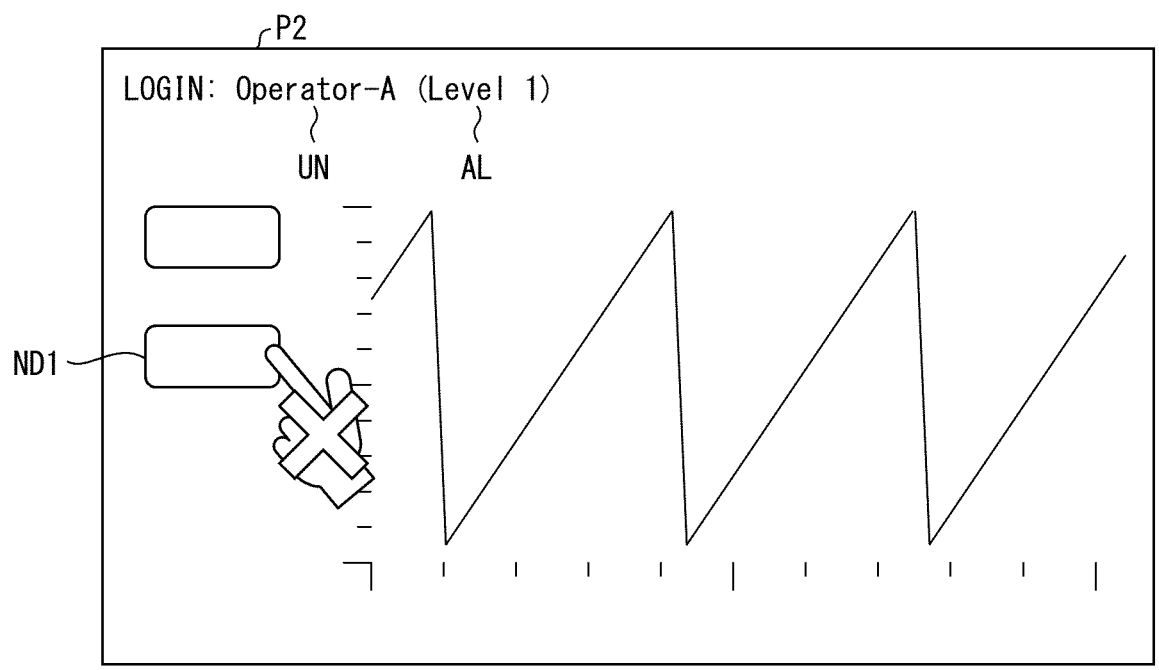
FIG. 6 is a view illustrating a display screen displayed on a display section included in a programmable display device in accordance with Embodiment 2 of the present invention.

The following will describe Embodiment 2 of the present invention. For convenience of description, members having functions identical to those described in Embodiment are assigned identical referential numerals, and their descriptions are omitted here. FIG. 6 is a view illustrating a display screen P2 displayed on a display section 20 included in a programmable display device 1 in accordance with Embodiment 2 of the present invention.

The following will explain a case where, in response to user input operation carried out on the display section 20 of the programmable display device 1, a process executing section 150 refers to authentication information stored in a user memory 40 and executes an authentication process of authenticating the user. In this case, if the user is authenticated by the process executing section 150, a display control section 110 causes the display section 20 to display the display screen P2 shown in FIG. 6.

The display screen P2 includes a user name UN and an authority level AL of the user authenticated by the process executing section 150. In the user memory 40, the user name, the authority level of the user, and the authentication information are preliminarily stored in association with each other.

A setting accepting section 140 refers to the authority level of the user and the authentication information stored in the user memory 40, and determines, in accordance with the authority level of the user, whether to permit or inhibit a transition to the setting screen. Specifically, the setting accepting section 140 permits a transition to the setting screen, if the setting accepting section 140 determines that the authority level of the user is equal to or higher than a predetermined level. Meanwhile, the setting accepting section 140 inhibits a transition to the setting screen, if the setting accepting section 140 determines that the authority level of the user is lower than the predetermined level. The setting screen described herein refers to any of the setting screens SP1 to SP3 of Embodiment 1.

The following will explain a case where the setting accepting section 140 determines that the authority level AL of the user is lower than the predetermined level in FIG. 6. In this case, even when the user carries out predetermined operation such as pressing and holding the numerical value indicator ND1 on the display screen P2, the setting accepting section 140 inhibits a transition to the setting screen and therefore the display control section 110 would not allow the display section 20 to display the setting item list L1.

In this case, the display control section 110 may cause the display section 20 to display, by e.g. a pop-up screen, information indicating an operation error. This configuration makes it possible to prevent an erroneous operation and an erroneous setting made by a user who is not familiar with the device and equipment and does not have an authority.

Embodiment 3

Figure 7:
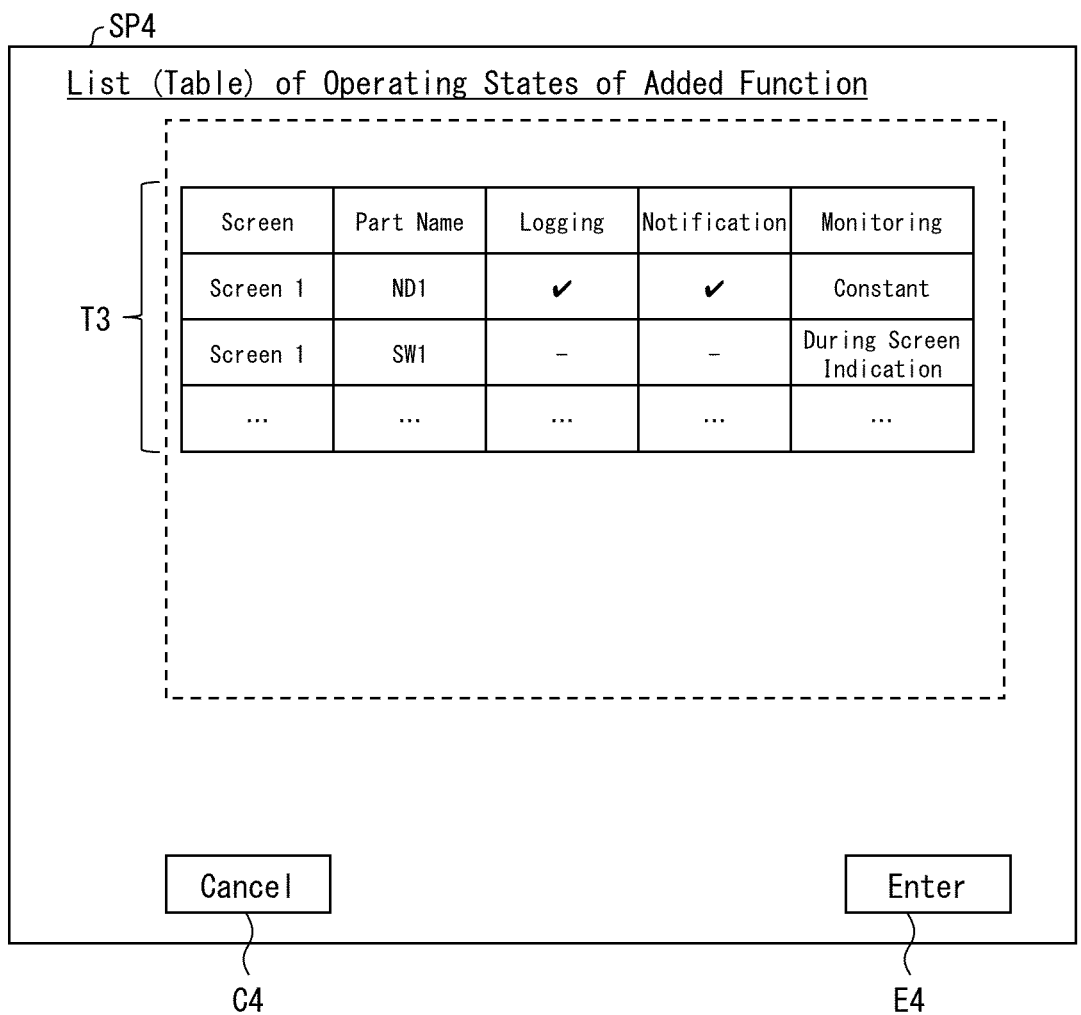
FIG. 7 is a view illustrating a setting screen displayed on a display section included in a programmable display device in accordance with Embodiment 3 of the present invention.

The following will describe Embodiment 3 of the present invention. For convenience of description, members having functions identical to those described in Embodiment are assigned identical referential numerals, and their descriptions are omitted here. FIG. 7 is a view illustrating a setting screen SP4 displayed on a display section 20 included in a programmable display device 1 in accordance with Embodiment 3 of the present invention.

If predetermined operation is carried out on the display screen P1 shown in FIG. 2 after an obtaining section 130 has started obtaining of data, the display control section 110 causes the display section 20 to display a setting screen SP4. The setting screen SP4 includes a table T3. The table T3 includes items that can be set via the setting screens SP1 to SP3 of Embodiment 1. These items are listed in the table T3.

In response to user operation of touching the items in the table T3, the setting accepting section 140 switches between activation and deactivation of the data logging, notification, and data analysis. The table T3 shows whether the data logging, notification, and data analysis are activated or deactivated.

Consequently, the user can easily check, in a list, whether each of the data logging, notification, and data analysis is activated or deactivated by referring to the table T3. As a result, it is possible to avoid performance degradation that might otherwise be caused by unnecessary operation. In addition, in response to user operation of touching one of the items in the table T3, the display control section 110 may cause the display section 20 to display a setting screen for the touched one of the items. Furthermore, in place of the table T3, icons indicating the items may be included in the setting screen SP4.

When the user carries out operation of touching the enter button E4 on the setting screen SP4, the setting accepting section 140 accepts, via the setting screen SP4, the process setting configured via the table T3 included in the setting screen SP4. The process executing section 150 causes the user memory 40 to store therein the process setting accepted by the setting accepting section 140. The display control section 110 causes the display section 20 to stop displaying the setting screen SP4, and then causes the display section 20 to display the display screen P1.

Meanwhile, when the user carries out operation of touching the cancel button C4 on the setting screen SP4, the display control section 110 causes the display section 20 to stop displaying the setting screen SP4, and then causes the display section 20 to display the display screen P1.

Note that, after the obtaining section 130 has started obtaining of the numerical data, the process executing section 150 may execute a process in which all of the process settings accepted by the setting accepting section 140 are stored in a project (a file including a series of the display screens) downloaded to the programmable display device 1. Alternatively, the process executing section 150 may execute a process in which, among the process settings, only a setting(s) being not a setting(s) already stored in the project is stored in the project.

In the case where the above process is carried out, the setting accepting section 140 may accept, via the setting screen, a selection as to whether (a) all of the accepted process settings are to be stored in the project or (b) among the accepted process settings, only the setting(s) being not the setting(s) already stored in the project is to be stored in the project. Thanks to this configuration, the amount of the information of the process setting(s) to be stored in the project may be reduced. This can save time. The project described above is downloaded to the programmable display device 1 from an external device such as a personal computer (PC), and is then stored in the user memory 40.

The following will explain a case where the process setting accepted by the setting accepting section 140 is applied also to another programmable display device 1. By storing the process setting in the project and storing the project in a storage medium or the like, it is possible to easily reflect the process setting also to another programmable display device 1. This may sometimes reduce the amount of the information of the process settings. In such a case, it is possible to save the time taken for such a work. That is, if there exist devices of the same type and pieces of equipment of the same type, it is possible to manage the process settings as settings specific to one of the devices or pieces of equipment or to manage the process settings as common settings for the devices and the pieces of equipment and duplicate the process settings.

[Software Implementation Example]

Control blocks (the control section 10, specifically, the display control section 110, the obtaining section 130, the setting accepting section 140, and the process executing section 150) of the programmable display device 1 can be realized by a logic circuit (hardware) provided in an integrated circuit (IC chip) or the like or can be alternatively realized by software.

In the latter case, the programmable display device 1 includes a computer that executes instructions of a program that is software realizing the foregoing functions. The computer, for example, includes at least one processor and at least one computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

A programmable display device in accordance with an aspect of the present invention includes: an obtaining section configured to obtain data; a setting accepting section configured to accept a process setting via a setting screen displayed in response to predetermined operation, the process setting concerning (a) a content of a process to be executed for the data obtained by the obtaining section and (b) information for executing the process; and a process executing section configured to execute the process including the content, on the basis of the information and in accordance with the process setting accepted by the setting accepting section, the setting accepting section being further configured to accept the process setting in a state where the obtaining section is executing the obtaining of the data.

The process setting configured via the setting screen is accepted in a state where the obtaining section is executing the obtaining of the data. Consequently, an end user can easily configure the process setting via the setting screen by himself/herself, without the need to pay attention to a variable name and/or a device address. This can reduce the cost and time taken for the process setting.

The setting accepting section may be further configured to accept, via the setting screen, accumulation of the data obtained by the obtaining section, the accumulation of the data being accepted as the content; and the process executing section may be further configured to execute, as the process, the accumulation of the data accepted by the setting accepting section. Consequently, the end user can easily configure, via the setting screen, the process setting for the accumulation of the data.

The setting accepting section may be further configured to accept, as the content, notification that is to be executed in a case where a predetermined condition on the data is satisfied, and the setting accepting section may be further configured to accept the predetermined condition as the information; and the process executing section may be further configured to execute the notification as the process, in a case where the predetermined condition on the data is satisfied. Consequently, the end user can easily configure, via the setting screen, the setting concerning the predetermined condition for the notification.

The programmable display device may further include a display control section configured to cause a display section to display the setting screen in response to the predetermined operation, the display control section being further configured to cause the display section to display a result of the process having been executed by the process executing section, wherein: the setting accepting section may be further configured to accept, via the setting screen, data analysis of analyzing the data obtained by the obtaining section, the data analysis being accepted as the content; the process executing section may be further configured to execute, as the process, the data analysis having been accepted by the setting accepting section; and the display control section may be further configured to cause the display section to display a result of the data analysis having been executed by the process executing section.

Since the setting screen is displayed on the display section and the result of the data analysis is also displayed on the display section, the end user can easily configure the process setting via the setting screen while referring to the result of the data analysis.

The setting accepting section may be further configured to accept, via the setting screen, at least one kind of one or more representative values of the data as the information, in the case where the setting accepting section accepts the data analysis as the content; the process executing section may be further configured to calculate only a representative value of said at least one kind having been accepted by the setting accepting section; and the display control section is further configured to cause the display section to display only the representative value having been calculated by the process executing section. The end user can cause the display section to display only a necessary representative value by setting a kind of a representative value via the setting screen.

The programmable display device may further include a display control section configured to cause a display section to display the setting screen in response to the predetermined operation, the display control section being further configured to cause the display section to display an object related to the data, wherein: the setting accepting section is further configured to accept, via the setting screen, a selection as to which of a first setting or a second setting is to be selected, the selection being accepted as the process setting, the first setting specifying, as target data, only data obtained by the obtaining section while the object is displayed on the display section, the target data being the data that is to be subjected to the process executed by the process executing section, the second setting specifying, as the target data, data obtained by the obtaining section while the obtaining section is executing the obtaining of the data; and the process executing section is further configured to: execute the process only for the data obtained by the obtaining section while the object is displayed on the display section, in a case where the first setting is accepted by the setting accepting section; and to execute the process for the data obtained by the obtaining section while the obtaining section is executing the obtaining of the data, in a case where the second setting is accepted by the setting accepting section.

In the case where the first setting is accepted by the setting accepting section, the amount of the data that is to be subjected to the process to be carried out by the process executing section is smaller than that of the case where the second setting is accepted, and thus the burden on the programmable display device can be reduced. In addition, since the above configuration enables the end user to switch between the first setting and the second setting, the amount of data to be collected can be changed according to the period of time to execute the process.

REFERENCE SIGNS LIST

1 Programmable display device
20 Display section
110 Display control section
130 Obtaining section
140 Setting accepting section
150 Process executing section
ND1 Numerical value indicator (object)
SW1 Switch (object)
TG1 Trend graph (object)
SP1 to SP4 Setting screen

The invention claimed is:
1. A programmable display device comprising:
a display section;
a memory;
an interface configured to connect to a programmable logic controller; and
a processor configured to obtain data from the programmable logic controller connected to the interface, cause the display section to display a setting screen in response to a predetermined operation, and cause the display section to display an object related to the data, wherein the processor is further configured to:
accept, via the setting screen, a process setting concerning (a) accumulation of the obtained data which accumulation is to be executed for the obtained data and (b) information for executing the accumulation of the obtained data, wherein the accepting the process setting is performed in a state in which the data is being obtained by the processor;
execute the accumulation of the obtained data, on the basis of the information and in accordance with the accepted process setting, wherein the execute the accumulation comprises accumulating the obtained data in the memory;
accept, via the setting screen, a selection as to which of a first setting or a second setting is to be selected,
wherein the first setting is a setting that is made for a process in which the obtained data is accumulated in the memory and that specifies, as target data for the accumulation, only a portion of the obtained data, wherein the portion of the obtained data is obtained while the object is displayed on the display section, and
wherein the second setting is a setting that is made for the process in which the obtained data is accumulated and that specifies, as the target data for the accumulation, the obtained data;
execute the accumulation of only the portion of the obtained data that is obtained while the object is displayed on the display section, in a case where the first setting is accepted; and execute the accumulation of the obtained data, in a case where the second setting is accepted, whereby, in the case where the first setting is accepted, an amount of the obtained data that is subjected to the accumulating in the memory is smaller than that of the case where the second setting is accepted.

2. The programmable display device as set forth in claim 1, wherein the processor is further configured to:

accept, via the setting screen, a setting concerning (c) notification that is to be executed in a case where a predetermined condition on the data is satisfied, and (d) the predetermined condition; and execute the notification, in a case where the predetermined condition on the data is satisfied.

3. The programmable display device as set forth in claim 1, wherein the processor is further configured to:

cause the display section to display a result of the executed accumulation of the obtained data;

accept, via the setting screen, a setting concerning data analysis of analyzing the obtained data;

execute the accepted data analysis; and cause the display section to display a result of the executed data analysis.

4. The programmable display device as set forth in claim 3, wherein the processor is further configured to:

accept, via the setting screen, at least one kind of one or more representative values of the data, in the case where the processor accepts the setting concerning the data analysis;

calculate only a representative value of said at least one kind thus accepted; and cause the display section to display only the calculated representative value.

* * * * *